(12) United States Patent
Edmiston et al.

(10) Patent No.: US 12,352,646 B2
(45) Date of Patent: Jul. 8, 2025

(54) CALIBRATED LOAD CELL

(71) Applicant: BECS Technology, Inc., St. Louis, MO (US)

(72) Inventors: Chris Edmiston, St. Louis, MO (US); Todd Steinbrueck, St. Louis, MO (US); Timothy Lee Bell, St. Louis, MO (US); Addison Elliott, St. Louis, MO (US)

(73) Assignee: BECS TECHNOLOGY, INC., St. Louis, MO (US)

( * ) Notice: Subject to any disclaimer, the term of this patent is extended or adjusted under 35 U.S.C. 154(b) by 320 days.

(21) Appl. No.: 18/119,497

(22) Filed: Mar. 9, 2023

(65) Prior Publication Data

US 2023/0213403 A1 Jul. 6, 2023

Related U.S. Application Data

(62) Division of application No. 17/205,312, filed on Mar. 18, 2021, now Pat. No. 11,630,018.

(51) Int. Cl.
*G01L 25/00* (2006.01)
*G01L 1/22* (2006.01)

(52) U.S. Cl.
CPC .............. *G01L 25/00* (2013.01); *G01L 1/225* (2013.01)

(58) Field of Classification Search
CPC .................................. G01L 25/00; G01L 1/225
See application file for complete search history.

(56) References Cited

U.S. PATENT DOCUMENTS

| 6,636,820 B2 * | 10/2003 | Livingston | G01G 23/01 |
| | | | 453/32 |
| 10,690,557 B2 * | 6/2020 | Pence | G01L 1/16 |
| 10,837,820 B2 * | 11/2020 | Schreiber | G01L 1/225 |

FOREIGN PATENT DOCUMENTS

ES 2753430 T3 * 4/2020 ............ H01M 10/44

* cited by examiner

*Primary Examiner* — Jamel E Williams
(74) *Attorney, Agent, or Firm* — Bryan Cave Leighton Paisner LLP

(57) ABSTRACT

A calibrated load cell includes a monolithic load beam having a first region, a second region on a distal end of the load beam from the first region for receiving a force from a load, and a third region arranged between the first and second regions, wherein the third region comprises a recess on one side of the load beam. A strain gauge is arranged in the recess for detecting a deformation of the third region from the load and for generating a strain gauge output signal proportional to the deformation of the third region. The load cell also includes a microcontroller arranged in the recess for receiving and processing the strain gauge output signal to produce a load cell output signal that represents the load on a load cell output cable. The microcontroller transforms the strain gauge output signal based on calibration parameters to produce the load cell output signal as a calibrated load cell output signal.

7 Claims, 11 Drawing Sheets

CALIBRATED LOAD CELL

CROSS-REFERENCE TO RELATED APPLICATIONS

This application is a divisional of U.S. application Ser. No. 17/205,312, filed Mar. 18, 2021, the disclosure of each of which is incorporated herein by reference in its entirety.

FIELD OF THE INVENTION

This invention relates to load cells and methods for calibrating load cells and, more particularly, to a method for calibrating a load cell at the point of manufacture.

BACKGROUND OF THE INVENTION

Knowledge of the weight of a grain bin and its contents is a common method for assessing the amount of grain that may be stored in the bin. This may be accomplished by instrumenting each of the support legs of the grain bin with a load cell and determining the total weight by aggregating the load experienced at each support leg. One of the inherent challenges to accurately determine the total weight of the grain bin in such a system is the need for calibrated load cells. As is known, the cost of calibrated load cells is substantially higher than uncalibrated load cells. In some applications, the cost of a calibrated strain gauge (i.e., one in which the output signal is linearly varying with weight with known slope and offset) is quite high. For larger grain bins, e.g., those supported by eight legs, it is not uncommon for the cost of calibrated strain gauges to exceed the cost of the grain bin itself.

The prior art describes various forms of calibrated load cells. These calibrated load cells are adjusted individually at the factory to provide the load cells with uniform offset and sensitivity factors. However, calibration and subsequent testing of load cells at the factory can raise the cost for manufacturing products that incorporate the load cells. To reduce this cost, previous devices calibrate load cells on products either after those products leave the factory or after the uncalibrated load cells have been installed in the field. For example, many calibrated load cells available in the market have calibration parameters printed on paper that must be manually entered into the measurement system or instrumentation that reads the load cell values. The instrumentation that reads the load cell then performs the calibrating transformation, changing the reading that is reported by the load cell into a calibrated reading.

U.S. Pat. No. 6,636,820 to Livingston addresses this issue by enabling the use of uncalibrated load cells to instrument a grain bin and describes a procedure for performing a calibration in the field. This approach requires that the grain bin be loaded with different known amounts of grain to perform the calibration. It also assumes that each uncalibrated load cell responds linearly to weight applied to the leg of the grain bin. U.S. Pat. No. 4,738,324 to Borchard describes methods to determine load cell offsets, scale factors, and the effects of structural flexure and distortion in the factory, and then programs unique calibration factors into each load cell. To accomplish this type of calibration, however, the load cells must be installed prior to shipment from the manufacturer. This is impractical where the load cells must be field-installed onto a storage device such as a grain bin. Similarly, U.S. Pat. No. 6,112,162 to Richards, attempts to solve this problem by performing an on-site calibration using multiple weights. Each weight is placed on top of each individual load cell, effectively determining the scale factor for that individual load cell. This process is repeated for each of the individual load cells, resulting in a time consuming operation.

The present invention addresses these issues in enabling a cost-effective calibrated load cell to be provided to the agricultural market and provides for calibration of an uncalibrated load cell and the safe retention of calibration parameters at the time of manufacture. The present invention removes the requirement for manually entering calibration parameters or performing calibration in the field. It also addresses the potential for non-linearities in the response characteristic of the load cell, thus providing a linear reading even under conditions in which the strain gauge signal is not linear. In addition, the invention described herein provides security from unwanted tampering with the system.

SUMMARY OF THE INVENTION

According to one aspect of the present invention, a calibrated load cell includes a monolithic load beam having a first region, a second region on a distal end of the load beam from the first region for receiving a force from a load, and a third region arranged between the first and second regions, wherein the third region comprises a recess on one side of the load beam. A strain gauge is preferably arranged in the recess for detecting a deformation of the third region from the load and for generating a strain gauge output signal proportional to the deformation of the third region. The load cell also includes a microcontroller arranged in the recess for receiving and processing the strain gauge output signal to produce a load cell output signal that represents the load on a load cell output cable. The recess having the strain gauge and microcontroller therein may be encapsulated in a potting material.

Preferably, the microcontroller transforms the strain gauge output signal based on calibration parameters to produce the load cell output signal as a calibrated load cell output signal. The calibration parameters may be stored in a memory accessible to the microcontroller after the recess has been encapsulated in the potting material. The calibration parameters may comprise a plurality of ordered pairs each comprising an ADC count and an associated output current and the microcontroller may compute the load cell output signal by assuming a linear response between each of the ordered pairs.

The microcontroller may be coupled to a calibration fixture that communicates the calibration parameters to the microcontroller and may provide a signal to the calibration fixture indicating that the microcontroller is capable of receiving the calibration parameters from the calibration fixture, which may be for only a short period of time following the signal from the microcontroller to the calibration fixture.

According to another aspect of the invention, a method for providing calibration parameters to the calibration load cell includes connecting the load cell output cable to the calibration fixture; imposing a weight selected from a plurality of known weights on the second region of the load beam; communicating by the calibration fixture a desired load cell output signal corresponding to the known weight to the microcontroller; receiving by the microcontroller the strain gauge output signal from the strain gauge at the known weight; storing in the memory the strain gauge output signal and the desired load cell output signal as one of the plurality of ordered pairs in the memory; modifying the weight imposed on the second region of the load beam; and repeating these steps for each of the plurality of known weights.

Yet another aspect of the invention includes a method for providing calibration parameters to the calibrated load cell wherein the load cell has an initial set of calibration parameters, the method including connecting the load cell output cable to the calibration fixture; communicating the initial set of calibration parameters from the calibrated load cell to the calibration fixture; repeatedly imposing a weight selected from a plurality of known weights on the second region of the load beam; receiving by the calibration fixture the load cell output signal; computing by the calibration fixture an error value between a weight reported via the load cell output signal and the known weight; storing the error value associated with the known weight by the calibration fixture; determining the maximum error value from the plurality of error values; adjusting at least one of the calibration parameters based on the error value associated with one of the plurality of known weights and storing a revised set of calibration parameters in the calibration fixture; and repeating these steps until the maximum error value falls below a desired threshold.

In another embodiment, any error attributable to the digital to analog converter in the microcontroller to generate the load cell output signal may be accounted for with a DAC calibration process in which a set of DAC calibration parameters is communicated from the calibration fixture to the calibrated load cell. The DAC calibration parameters may include two ordered pairs each comprising an ADC count and a DAC count corresponding to an expected output current, wherein the first ordered pair representing a large weight imposed on the load beam and the second ordered pair representing a small weight imposed on the load beam. The calibration fixture may communicate a first DAC calibration signal to the load cell such that the load cell output signal is based on the first ordered pair and a second DAC calibration signal such that the load cell output signal is based on the second ordered pair. The calibration fixture may then process the load cell output signals to determine a DAC correction transform that accounts for any error within the load cell in producing the load cell output signal from the DAC count and this transformation may be applied to the calibration parameters stored in the memory.

A further embodiment of the invention includes a method for bi-directional digital communication to and from a device having a sensor for accumulating information, a communication cable coupling the device to an external system, a microcontroller for processing and communicating the processed information to the external system via the communication cable as a current signal the device by (i) communicating digital information from the device to the external system by setting the output current less than an output low threshold for a logical 0 and higher than an output high threshold for a logical 1; and (ii) communicating digital information from the external system to the device by the external device establishing a voltage less than an input low voltage for a logical 0 and higher than an input high voltage for a logical 1.

BRIEF DESCRIPTION OF THE FIGURES

These and other features, aspects and advantages of the invention will become more fully apparent from the following detailed description, appended claims, and accompanying drawings, wherein the drawings illustrate features in accordance with an exemplary embodiment of the present invention, and wherein:

DETAILED DESCRIPTION OF THE INVENTION

Figure 1:
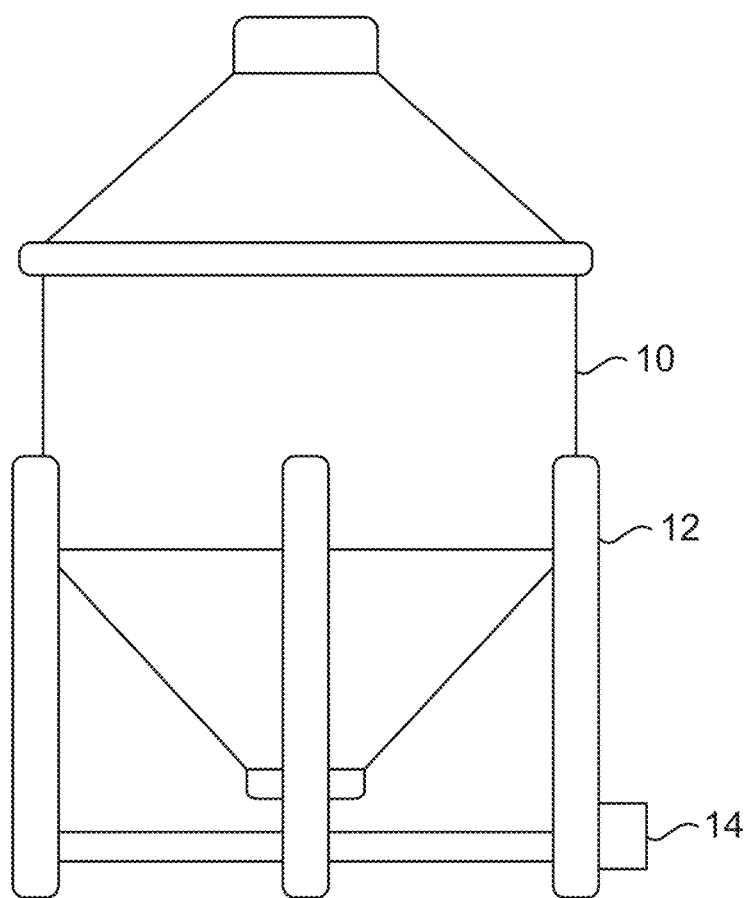
FIG. 1 is an illustration of a grain bin having a load cell installed at the base of each leg.

FIG. 1 illustrates a conventional bin 10 having a plurality of legs 12 used for storing granular material such as grain. In one embodiment, one or more of the legs 12 of the bin 10 may be instrumented with a load cell 14 designed to aid in measuring the weight and, therefore, the quantity, of granular material stored in the bin 10. Various embodiments may be described in connection with a calibrated load cell for use with a grain bin, although the systems and methods described herein may be used with other forms of systems for measuring granular material.

Figure 2:
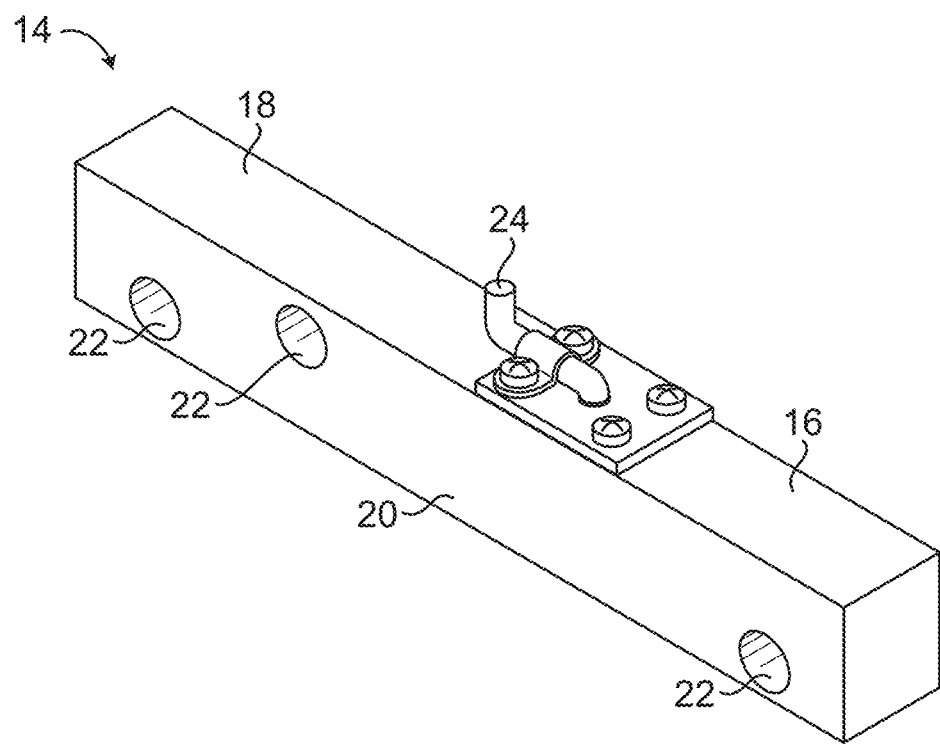
FIG. 2 is a top perspective view of an exemplary load cell.

FIGS. 2-5 illustrate one embodiment of a load cell 14. The load cell 14 may be in the form of a monolithic load beam having a square or rectangular cross section, although other geometries and types of load cells are within the scope of this invention, including any suitable rigid structure capable of deforming under a load or strain. The load cell 14 may be characterized as having three regions along its longitudinal extension. The first region 16 may be affixed to a stationary object using, for example, bolts passing through one or more channels 22 extending through the first region 16. The second region 18 encompasses the force application side of the cell 14 and may also include one or more channels 22 for receiving bolts or other means for attaching the load cell 14 to the object to be measured, for example, the bin 10. The third region 20 is the deformation section lying between the first region 16 and the second region 18 and preferably includes components for measuring the strain placed on the second region 18 of the load cell 14 as described below. The top side of the load cell 14, as shown in FIG. 2, may include a three-conductor cable 24 for communicatively connecting the load cell 14 for power, signal transmission, and calibration, as further described below.

Figure 3:
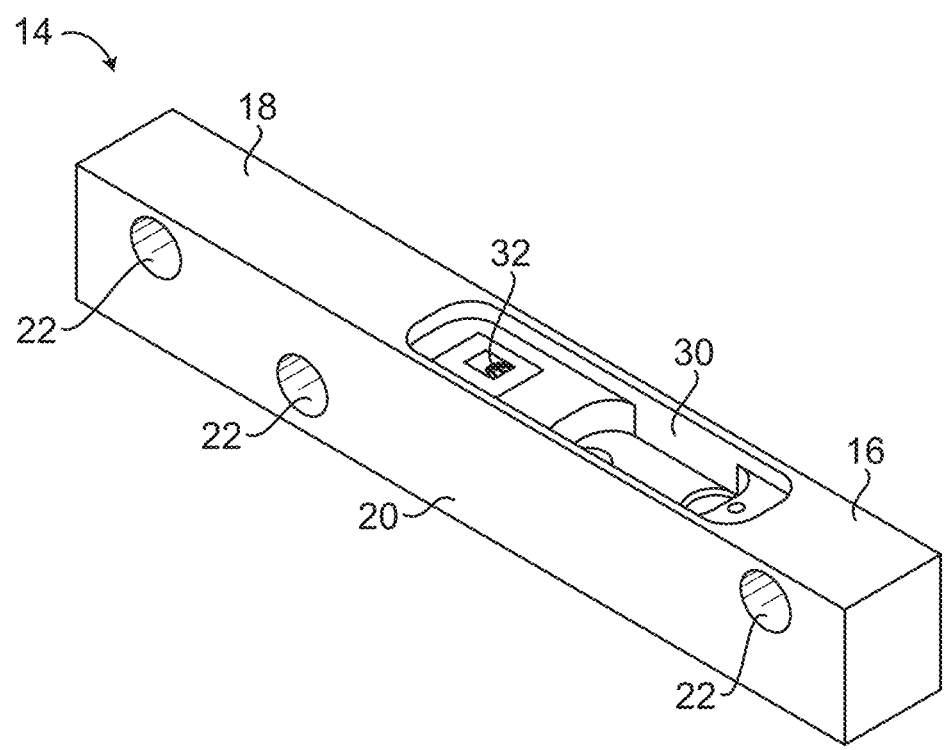
FIG. 3 is a bottom perspective view of an exemplary load cell.
Figure 4:
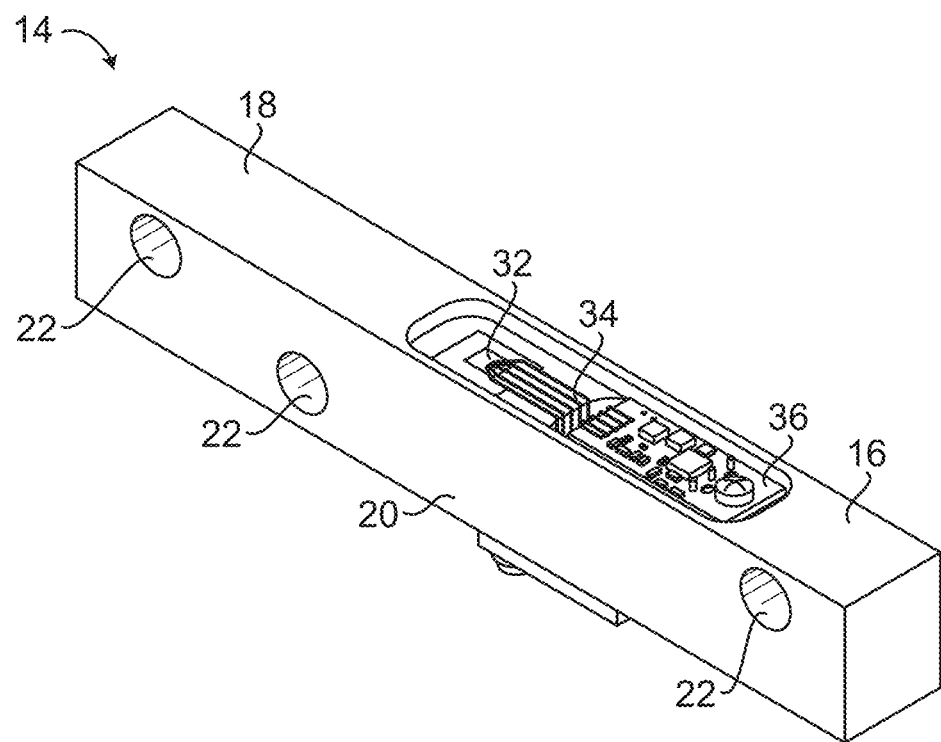
FIG. 4 is another bottom perspective view of an exemplary load cell.
Figure 5:
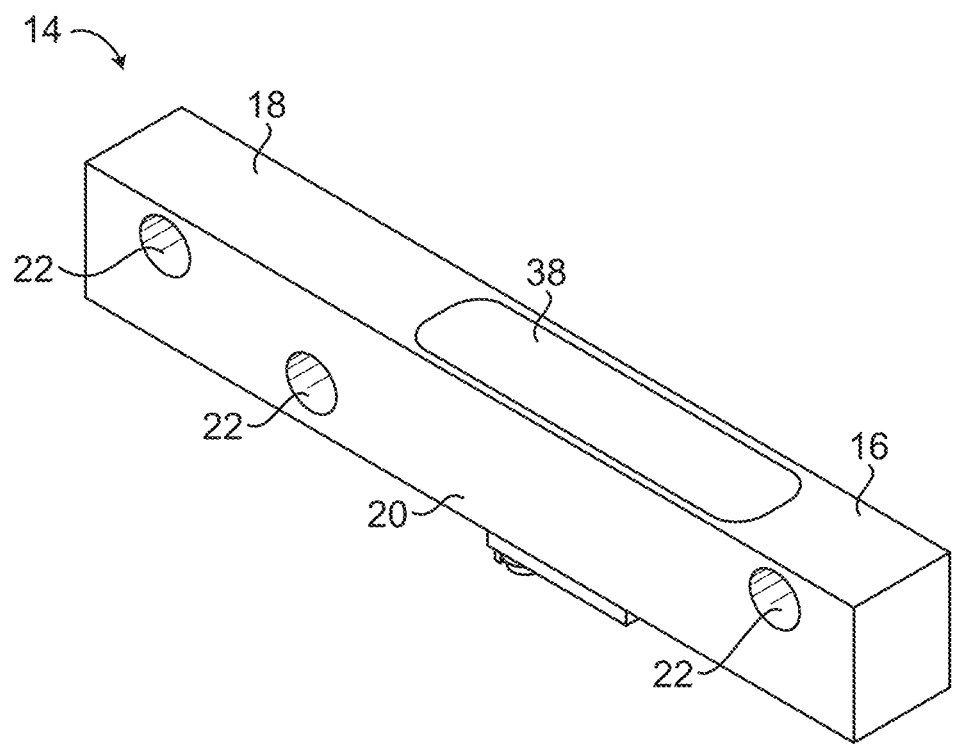
FIG. 5 is a further bottom perspective view of an exemplary load cell.

FIG. 3 illustrates the bottom side of the load cell 14, which includes a pocket or recess 30 for housing the electronics built into the load cell 14. The recess 30 includes sensors to detect the deformation of the load cell under applied weight such as strain gauge sensors 32 and, as shown in FIG. 4, a ribbon cable 34 coupling the sensors 32 to a printed circuit board 36. The strain gauge sensors 32 may be arranged to form a Wheatstone bridge and may be of a variety of types including piezo resistor strain gauges, fiber optic gauges, capacitive strain gauges, or any other suitable gauge. The circuit board 36 includes a plurality of electronics, including an analog-to-digital converter, to provide signal processing of the output signals from the sensors 32, which are preferably in the form of ADC counts. The board 36 also includes a form of microcontroller and non-volatile memory. To provide environmental protection and security from electronic tampering, the recess 30, containing the sensors 32, the cable 34, and the board 36, may be potted with a potting material 38 as shown in FIG. 5. Preferably, the potting material 38 is flush with or below the surface of the load cell 14.

In use, the weight of an individual leg of the bin 10 is applied to the second region 18 of the load cell 14 via a mechanical assembly, generating a deformation in the deformation area, i.e., third region 20, by the shear movement of the force applied to the second region 18. This deformation may be detected via the strain gauge sensors 32, which then emit a measurement signal corresponding to the deflection to the board 36 via cable 34. The circuit board 36 contains electronics that translate the strain information from the strain gauge sensors 32 into a calibrated output current signal on cable 24 that represents the load on the leg of the bin 10 in which the load cell 14 is installed.

Post manufacture, but prior to shipment to the field, the finished load cell 14 of FIG. 5 may be placed in a fixture for calibration as described below. The calibration parameters are stored in the non-volatile memory of the circuit board 36 so that they are retained when power is not provided to the load cell 14. During operation, the calibrating transformation from strain gauge sensors 32 to load cell current output is performed within the microcontroller on the board 36 of the load cell 14 itself.

The microcontroller that is installed within the load cell 14 performs the transduction or transformation operation, translating ADC counts from an instrumentation amplifier monitoring the output of the strain gauge sensors 32 on the ribbon cable 34 into an output current signal representing the load on the cell 14. In one embodiment, the ADC counts may range from approximately 2500 at bottom of the scale to 9000 at top of the scale (using a 14-bit ND conversion) and are transformed into an output current signal of 400 µA at bottom of the scale (empty) to 1400 µA at top of the scale (full).

Figure 6:
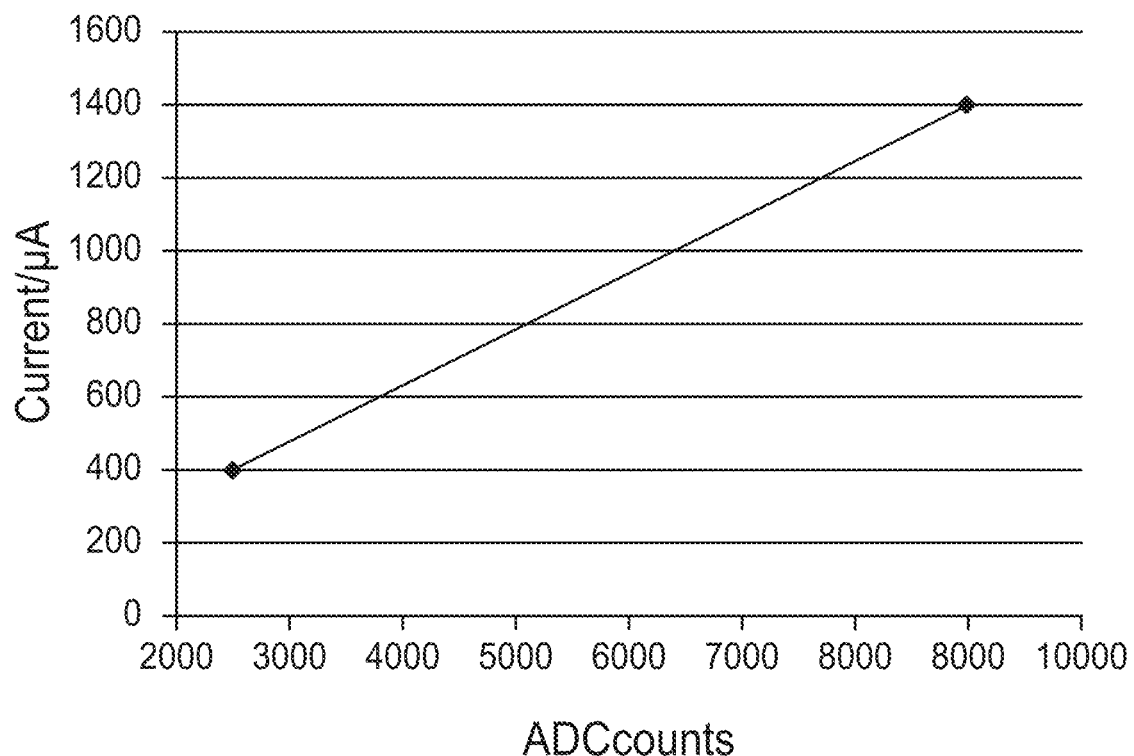
FIG. 6 is a graph mapping the ADC counts to the output current of the load cell.

If this transformation is linear, the above two points can be used to establish the expression i=mc+b, where i is the output current signal (in mA), c is the ADC counts from the strain gauge sensors 32, and m is the slope, which may be expressed as $$m = \left(\frac{1400\mu A - 400\mu A}{9000 - 2500}\right) = 0.154^{\mu A}/ADCcount$$

and b is the offset, b=400 µA−0.154(2500)=15 µA or i=0.154c+15 µA. This embodiment is illustrated in the graph of FIG. 6, and corresponds to the case where two calibration points are entered.

As is known, the response from the strain gauge sensors 32 may not be linear over a range of weight values. For example, the true response of the strain gauge sensors 32 may dip below the straight line response illustrated in FIG. 6. This is illustrated using a 4-point piece-wise linear transformation calibration in FIG. 7, where the calibration values are as follows:

| ADC Counts | Current (µA) |
|---|---|
| 2500 | 400 |
| 5000 | 720 |
| 7000 | 1010 |
| 9000 | 1400 |

Figure 7:
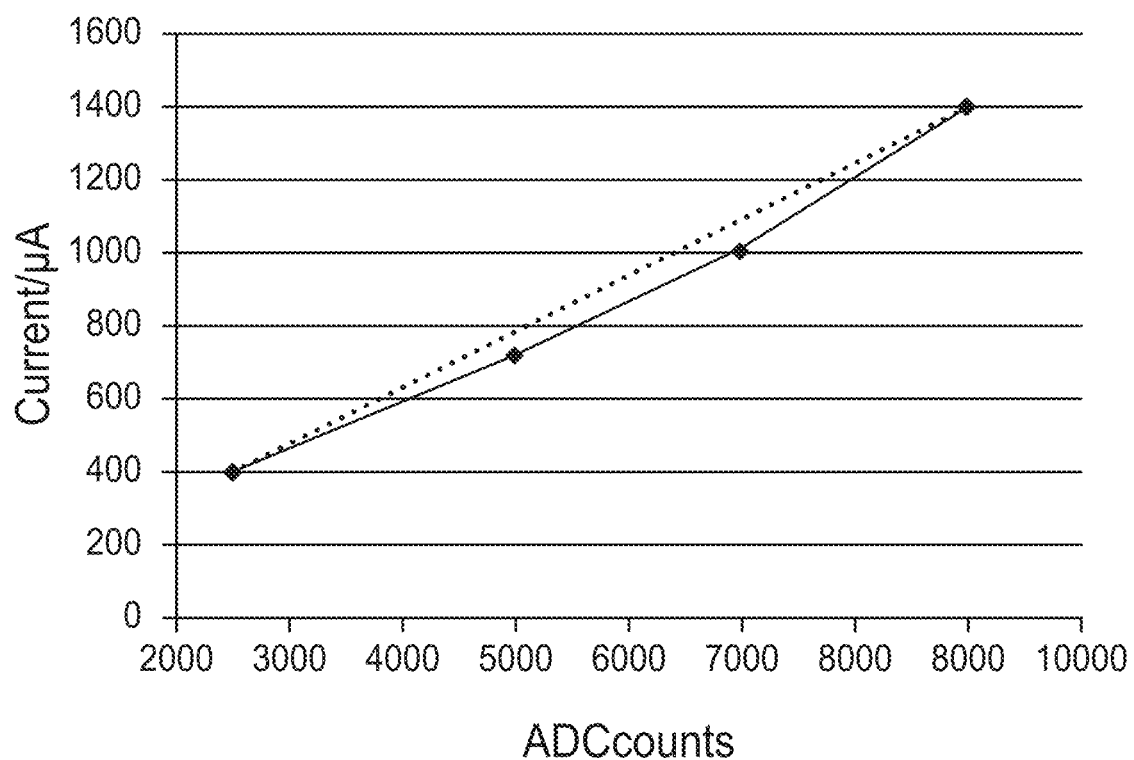
FIG. 7 is another graph mapping the ADC counts to the output current of the load cell.

In FIG. 7, the dashed line represents the linear transformation corresponding to only the first and last calibration points. The piece-wise linear transformation that follows all of the calibration points is clearly below the dashed line.

As another example, the true response of the strain gauge sensor might rise above the straight line of FIG. 6. This is illustrated using a 5-point piece-wise transformation calibration in shown in FIG. 8, where the calibration values are as follows:

| ADC Counts | Current (µA) |
|---|---|
| 2500 | 400 |
| 3000 | 550 |
| 6000 | 1010 |
| 7500 | 1200 |
| 9000 | 1400 |

Figure 8:
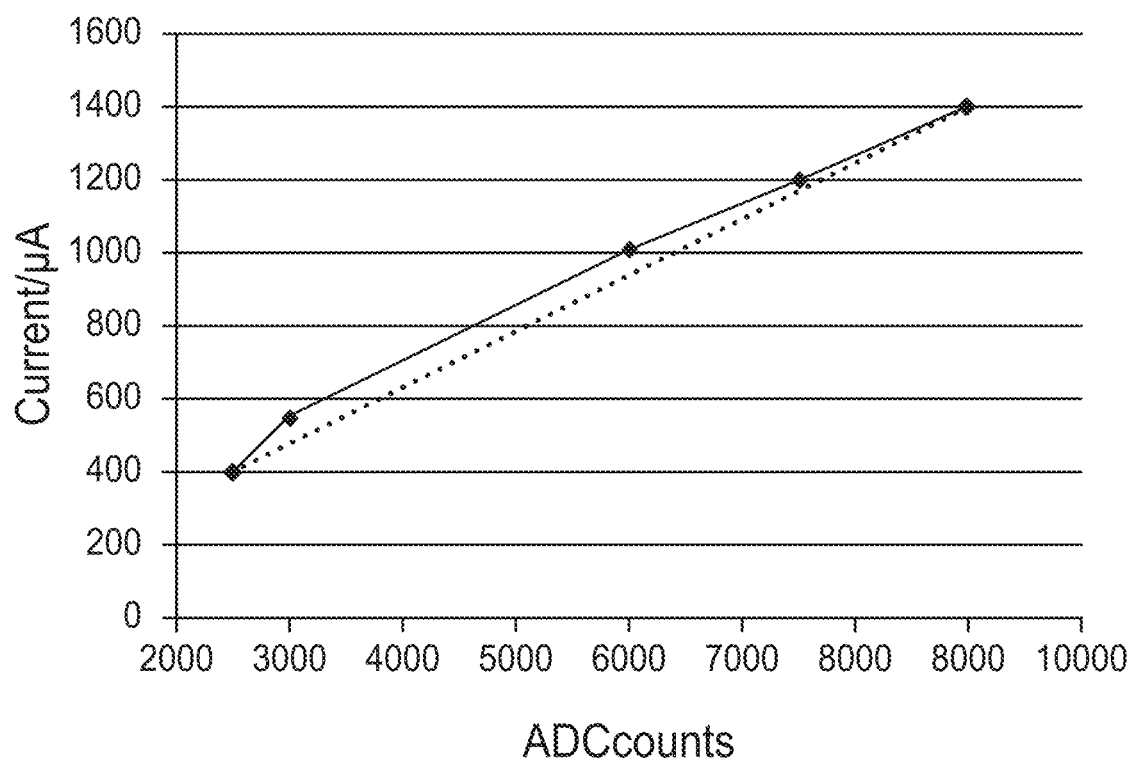
FIG. 8 is a further graph mapping the ADC counts to the output current of the load cell.

Again, in FIG. 8, the dashed line represents the linear transformation corresponding to only the first and last calibration points. The piece-wise linear transformation that follows all of the calibration points is clearly above the dashed line in this case.

Using the current signaling wire (as described above), the actual response curve can be mimicked to whatever degree is desired by providing any number of calibration points (in the preferred embodiment, the limit is set to 8 points). The response of the load cell 14 is then determined to be the piece-wise linear concatenation of lines between these calibration points. An additional constraint is that the points must be continuously increasing (i.e., the individual line segments must have positive slope, and the overall response curve is monotonically increasing).

The electronics on the circuit board 36 include a microcontroller that performs the piece-wise linear transduction described in the previous section. During the manufacturing process, embedded software executing on the microcontroller is loaded into non-volatile memory associated with the microcontroller via a connector on the circuit board 36.

As described above, preferably at a later stage in the manufacturing process, after the circuit board 36 has been mounted into the recess 30 in the bottom of the load cell 14 (see FIGS. 3 and 4), the circuit board 36 is covered with potting material 38. This makes it impractical to reprogram the microcontroller, enhancing the security of the system. Even physical contact with the load cell 14 does not give a malicious actor access to a programming interface (connector) on the microcontroller.

Nominally, this physical protection associated with the programming interface would also preclude the ability to store calibration parameters in the non-volatile memory associated with the microcontroller. However, it is advantageous to calibrate the load cell 14 late in the manufacturing process. Specifically, the calibration should occur after the potting material 38 has been installed and cured, since the physical properties of the potting material can potentially impact the transfer of the weight on the load cell 14 to the signal from the strain gauge sensor 32.

A mechanism to communicate calibration parameters to the microcontroller without the use of the regular programming interface (which is inaccessible due to the potting material 38), enables this by supporting a combination analog/digital communication via the 3-conductor cable 24 used for normal operation.

Preferably, the three conductors on the cable 24 include a ground reference, power (e.g., +5 V power to the load cell 14), and a signal conductor indicating the weight applied to the load cell 14. To enable the communication of the calibration parameters to the microcontroller installed on the circuit board 36 after the potting material 38 has been installed and cured, the purpose of the signal conductor 24 may be expanded to support bidirectional communication.

For signaling from the load cell 14, the communication across the conductor 24 is a current signal. Under normal operation, this current signal indicates weight. However, under software control of the microcontroller, it is possible to send digital information via this current signal. For example, any current less than a specified threshold (nominally one-half scale, or 900 µA) is received as a LOW digit and any current greater than the threshold is received as a HIGH digit.

In addition, individual fixed current levels may be defined to have specific meaning. For example, a fixed output of the top of the scale might indicate "invalid calibration parameters." In the preferred embodiment, the load cell 14 outputs a current of 150 µA to indicate "waiting for calibration data."

Figure 9:
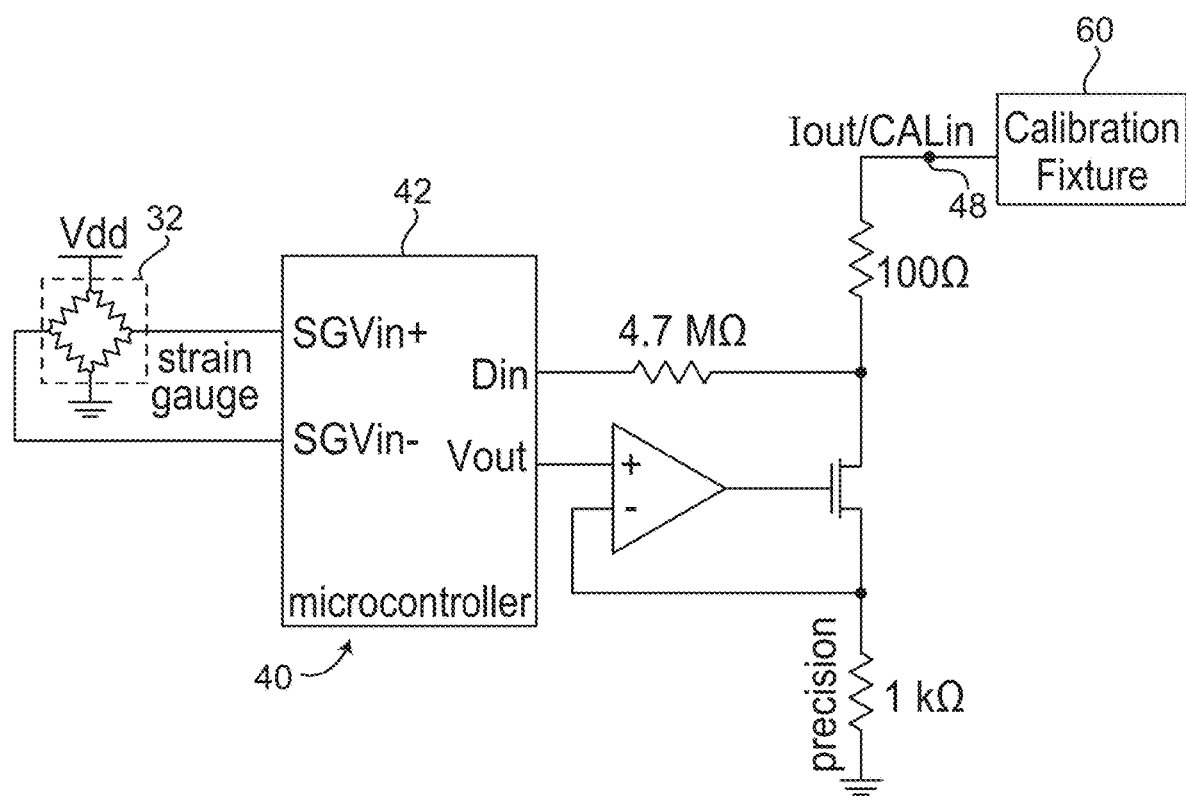
FIG. 9 is a circuit diagram of a load cell interface circuit.
Figure 10:
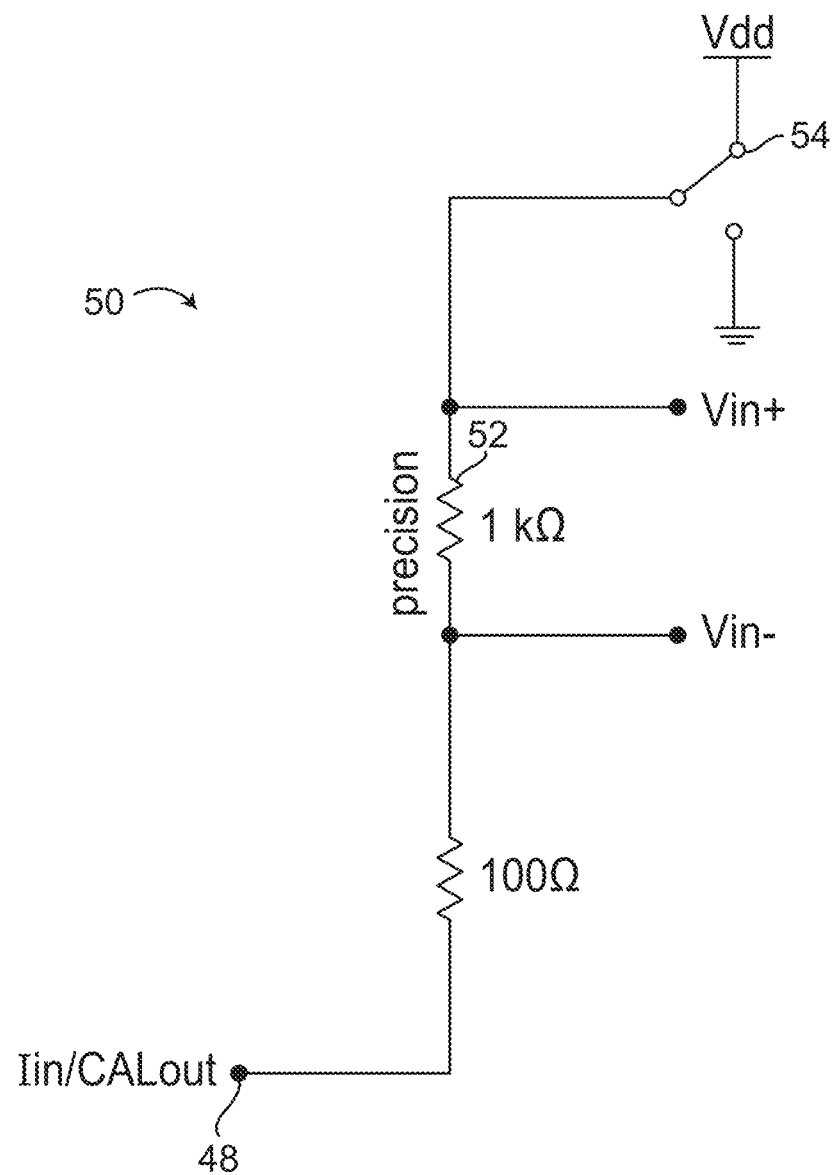
FIG. 10 is a diagram of a circuit for reading the output current of the load cell interface circuit.

For signaling to the load cell 14, the communication may be a voltage signal. FIG. 9 illustrates a preferred load cell interface circuit 40. In this circuit, the desired output current is established by the microcontroller 42 at $V_{out}$, with the output current $I_{out}$ effectively $V_{out}/1$ kΩ. This output current may be read at node 48 by a calibration fixture, for example, using the circuit 50 illustrated in FIG. 10. This node 48 is identified as $I_{out}/CAL_{in}$ to represent its dual purpose acting as both a node for transmitting the output current of the load cell 24 in normal operation and as operating as input calibration voltage during the calibration process.

Figure 11:
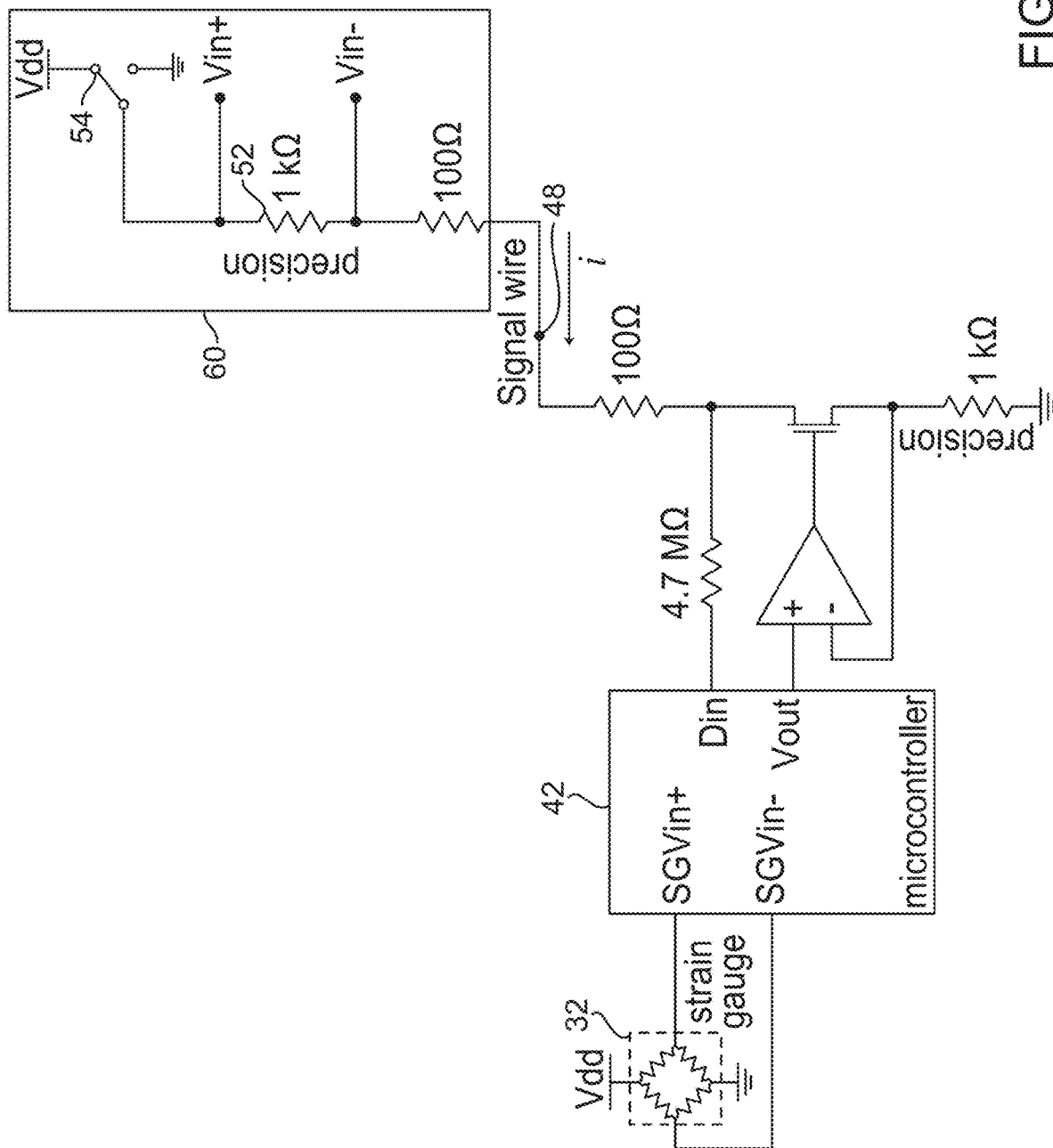
FIG. 11 is a circuit diagram illustrating one embodiment of an interface circuit for calibration of a load cell.

When the $I_{out}/CAL_{in}$ pin 48 of the load cell 14 is connected to the communication interface of the calibration fixture 60, the result is the circuit of FIG. 11. In this circuit, the "Signal wire" connects the $I_{out}/CAL_{in}$ node 48 of the load cell 14 with the communication interface of the calibration fixture 60.

With the switch 54 in the calibration fixture connected to Vdd, the current signal i from the load cell 14 establishes a voltage Vin=i·1 kΩ across the precision resistor 52 in the fixture 60, enabling the fixture 60 to read the current signal from the load cell 14.

The present invention also provides a voltage signal communicated from the calibration fixture 60 to the load cell 14. First, to send a logical zero (low level) to the load cell 14, the calibration fixture 60 sets the switch 54 to GND (0 V). Although illustrated as a switch, in a preferred embodiment, the switch 54 may be constructed using transistors. Under this circumstance, independent of the value of $V_{out}$ in the load cell 14, the voltage at $D_{in}$ within the load cell 14 is a logical low (below the "low" threshold of the digital input $D_{in}$). $D_{in}$ is connected to a digital input pin of the microcontroller.

To send a logical one (high level) to the load cell 14, the calibration fixture 60 sets the switch 54 to $V_{dd}$. In this case, the voltage at $D_{in}$ will depend upon the output current i. At top of scale (i=1400 µA), $D_{in}$ is approximately Vdd−i·1.2 kΩ=3.32 V (if Vdd=5V), which is well above the "high" threshold at $D_{in}$. At bottom of scale (i=400 µA), $D_{in}$ is approximately $V_{dd}$=i·1.2 kΩ=4.52 V (if Vdd=5V), which is also well above the "high" threshold at $D_{in}$.

In this way, the calibration fixture 60 may communicate digital information to the load cell 14. If the switch is controlled by the TX line of an asynchronous UART on the calibration fixture 60, and the $D_{in}$ is connected to the RX line of an asynchronous UART on the load cell 14, serial communication is straightforward. In the embodiment described, the data rate is fairly low (at 200 Kbits/s); however, any data rate that can be sustained by the loading effects of the cable 24 can be supported.

Preferably, an additional feature to reduce the chances of an accidental (or malicious) recalibration may be incorporated based on the timing requirements of recalibration. On power-up, the load cell 14 may send an analog output signal of 150 µA to indicate it is "waiting for calibration data." The load cell 14 maintains this output for a short amount of time, for example, 5 seconds. During this time window, the load cell 14 is receptive to a calibration message. After this time period elapses, the output signal reverts to signaling the weight incident on the load cell 14, and no calibration messages are acknowledged.

In embodiments where one-way communication from the calibration fixture to the load cell 14 is sufficient, maintaining the output current at a low value has the additional benefit that it provides maximum noise margins for the "high" voltage at $D_{in}$. In this case, (i=150 µA), and $D_{in}$ is approximately Vdd−i·1.2 kΩ=4.82 V (if Vdd=5V).

There are multiple methods by which one can determine the calibration points illustrated in FIGS. 6, 7, and 8. As illustrated in FIGS. 6, 7, and 8, the calibration points may be represented by a set of ordered pairs, ($count_i$, $current_i$), where i ranges from one to the number of calibration points.

One approach to determining these points is for the microcontroller software to provide information to the calibration fixture 60 as to the actual value of the ADC counts at a discrete set of imposed weights. In this embodiment, the calibration fixture 60 imposes a known weight on the load cell 14, the load cell 14 provides the ADC counts at that weight to the calibration fixture 60, and this process is repeated for several different weights. The communication of the ADC counts can occur in at least two different ways: (1) using the digital communication techniques described above, or (2) adopting the linear transduction curve of FIG. 6 and communicating the ADC counts as an analog signal (which is then read at the Vin+ and Vin− terminals on the calibration fixture 60).

A second approach is for the calibration fixture 60 to impose a set of weights on the load cell 14 and, for each distinct value of weight, the calibration fixture 60 communicates the desired output current to the load cell 14, the load cell 14 samples the ADC counts, and then the load cell 14 stores the ($count_i$, $current_i$) pair as one of its calibration points.

Each of the above approaches has merit, but they both make the simplifying assumption that the digital-to-analog converter for the microcontroller on the load cell 14 and the voltage-to-current circuitry illustrated in FIG. 9 both give a linear response. A third preferred approach does not make this assumption, and will correct for non-linearities throughout the load cell 14 signal path (from mechanical stress all the way to output current signal). The iterative approach can be expressed in terms of the following greedy algorithm: starting with an initial set of calibration parameters (e.g., those of FIG. 6), loop over a set of fixed, known weights applied by the calibration fixture 60, measuring the current output at each position. The error between the known weight and the desired output for each point is then computed by the calibration fixture 60. For one of the points that has a non-zero error (e.g., the point with the maximum error), the calibration parameter is adjusted at that point to diminish the error at that point. Looping over the set of fixed, known weights continues until the maximum error is below a given desired amount.

Although, this iterative approach described above is in the form of a greedy algorithm, any iterative meta-heuristic approach may be used, such as, for example, simulated annealing as illustrated in S. Kirkpatrick, C. D. Gelatt Jr., M. P. Vecchi, *Science,* 13 May 1983: Vol. 220, Issue 4598, pp. 671-680. DOI: 10.1126/science.220.4598.671; genetic algorithms as illustrated in M. Mitchell, *An Introduction to Genetic Algorithms*. MIT Press, 1998; threshold acceptance as illustrated in G. Dueck and T. Scheuer, *Journal of Computational Physics,* 1990: Vol. 90, Number 1, pp. 161-175. DOI: 10.1016/0021-9991(90)90201-B, as well as other algorithms known to those skilled in the art.

Using the techniques above, calibration parameters support both linear and non-linear transduction. In the preferred embodiment, this transduction takes place within the load cell 14 itself. In an alternative embodiment, the calibration parameters are stored in the load cell 14, but the transduction may be performed externally to the load cell 14, for example, in the instrumentation to which the load cell 14 is attached. In this alternative embodiment, the bi-directional communications capability described above may be used to communicate the stored calibration parameters to the external instrumentation.

Those skilled in the art will appreciate that any imprecision in the response of the load cell, i.e., translating the response from the strain gauge into an output current, has two components. The first is any error or imprecision in converting the strain gauge 32 reading to ADC counts within the microcontroller 42. The second is any error in converting the DAC counts within the microcontroller 42 to an output current.

As is known, during the calibration procedure, calibration parameters are introduced in a digital form and are converted by the load cell 14 via an internal digital-to-analog converter (DAC). Yet another calibration procedure preferably includes adding a discrete DAC calibration step to the process in order to characterize any error introduced by the DAC in the load cell 14 during the calibration process and, therefore, account for any error caused by the DAC. To accomplish this, sets of fixed-output calibration data are generated by calibration fixture 60 and are loaded into the load cell 14 as described above. Preferably, this data is generated in a manner in which the load cell 14 views it as valid calibration data (e.g., each calibration point must be greater than the previous point). However, this fixed-output calibration data is exaggerated such that the load cell 14 effectively ignores the internal ADC reading and outputs a fixed current.

For example, the calibration data may include a pair of ADC counts arranged such as (Actual, Expected), where "Actual" represents the digital value read by the ADC within the load cell 14 (i.e., ADC counts) and "Expected" represents the digital value representing the output current that should have been read by the ADC assuming no error due to the DAC. Thus, if the load cell 14 had a perfect response that required no calibration, the values for "Actual" and "Expected" would be identical. During this process, the calibration data must include at least two pairs of ADC counts and linear interpolation may be used between each adjacent pair.

As an example, assume that the load cell 14 reports a current of 400 µA for an ADC count of 2500 (representing no load on the load cell 14) and a current of 1400 µA for an ADC count of 9000 (representing full load). The calibration fixture 60 may force the ADC count to a digital value of approximately 2500 (corresponding to 400 µA) regardless of what the actual ADC count is by sending calibration data of (2500, 2500) (9000, 2501) to the load cell 14. Thus, if the actual ADC count is 2500, the ADC reports 2500, and if the actual ADC count is 9000, the ADC reports 2501. Thus, the entire range of expected inputs would be compressed to an output range of only two digital values (2500-2501). In a similar fashion, in order to force the ADC count to a digital value of approximately 3800 (corresponding to 600 µA) regardless of what the actual ADC count is, the calibration fixture 60 may send calibration data of (2500, 3800) (9000, 3801).

Thus, for this process, the calibration fixture 60 sends a sequence of different calibration data sets to the load cell 14 for different expected output values and records the current read by the calibration fixture 60 for that value along with the digital value that was requested. Using this information, any error due to the DAC may be characterized for the load cell 14. A transform (again, linearly interpolated) may be created to provide the digital value that the calibration fixture 60 must request to receive any desired current output. The new 1:1 calibration data may then loaded back into the load cell 14 and the calibration procedure continues as described above. This DAC correction transform is applied to the calibration points generated and sent to the load cell 14 for the remainder of the calibration process. Thus, any error attributed to the DAC has been accounted for, and there should be no calibration error on the input side.

Although the ability to incorporate bi-directional communication capability has been illustrated using the calibrated load cell described herein, those skilled in the art will recognize that such bi-directional communication may be incorporated into any device that normally transmits status information or data one way. For example, a device having some form of sensor for measuring or otherwise accumulating information, and a form of microcontroller for communicating the measured or accumulated information (possibly after processing by the microcontroller) to an external system via a nominally one-way communication means may be improved by permitting bi-directional communication to and from such device over the communication means. Thus, if the device is designed to output its results as a current signal over a communication cable that is coupled to the external system, the external system may communicate information to the device by placing a voltage signal on the communication means that may be acted upon by the microcontroller.

For example, bi-directional digital communication between the device and the external system may include communicating digital information from the device to the external system by setting, by a microcontroller within the device, an output current less than an output low threshold for a logical 0 and higher than an output high threshold for a logical 1. In a like fashion, communicating digital information from the external system to the device may be accomplished by the external device establishing a voltage less than an input low voltage threshold for a logical 0 and higher than an input high voltage threshold for a logical 1. Each of the device and the external system may include a UART, and the bi-directional communication that occurs between these two systems is enabled via the UARTs. Communication between the device and the external system may be initiated by either—for example, communication from the external system to the device may be initiated by the external system communicating an input communication signal having a voltage level substantially lower than the input low voltage threshold to the device, which may indicate that the external system is able and/or willing to communicate with the device. Similarly, communication from the device to the external system may be initiated by the device communicating an output communication signal having an output current substantially greater than the input high threshold to the external system, which may indicate that the device is able and/or willing to communicate with the external system.

The present invention improves the prior art in a number of ways. For example, to support non-linearity in the response of the strain gauge sensors 32, the calibration process utilizes a fixed, but arbitrary number of calibration points, and the output current signal of the load cell 14 is computed as the piece-wise linear concatenation of these calibration points. In addition, as a security feature, the program stored in the embedded microcontroller on the circuit board 36 is inaccessible after the potting material has cured. However, it is desirable to perform the calibration of the load cell 14 after the potting process, as the mechanical properties of the potting material can impact the calibration of the load cell 14. To address this, the calibration of the load cell 14 may be performed by bi-directionally communicating with the microcontroller using the same signal wire 24 that is used for the output current signal from the load cell 14 in normal operation. Preferably, this communication to the load cell 14 is constrained to a limited time period after power-up of the load cell 14.

Although certain illustrative embodiments and methods have been disclosed herein, it will be apparent from the foregoing disclosure to those skilled in the art that variations and modifications of such embodiments and methods may be made without departing from the spirit and scope of the invention. For example, those skilled in the art will recognize that the present invention may be readily adapted to fit any configuration where field calibration of uncalibrated load cells is required. In addition, although many of the embodiments illustrated herein are used in connection with determining the weight of, or amount of grain in, a bin, the systems and methods described herein may be used in connection with load cells used in many applications. Accordingly, the invention should be limited only to extent required by the appended claims and the rules and principals of applicable law.

The invention claimed is:

1. A method for bi-directional digital communication between a device having a sensor for accumulating information and an external system, wherein a communication cable couples the device to the external system and wherein a microcontroller processes the accumulated information into processed information and communicates the processed information to the external system via a communication cable as a current signal, the method comprising the steps of:
   communicating digital information from the device to the external system by setting, by the microcontroller, the output current less than an output low threshold for a logical 0 and higher than an output high threshold for a logical 1; and
   communicating digital information from the external system to the device by the external device establishing a voltage less than an input low voltage threshold for a logical 0 and higher than an input high voltage threshold for a logical 1.

2. The method of claim 1 wherein the device is a load cell.

3. The method of claim 1 wherein the device and the external system each comprise a UART and the bi-directional communication occurs between the UARTs.

4. The method of claim 1 wherein communication from the external system to the device is initiated by the external system communicating an input communication signal comprising a voltage level substantially lower than the input low voltage threshold to the device.

5. The method of claim 4 wherein the input communication signal indicates that the external system is available to communicate with the device.

6. The method of claim 1 wherein communication from the device to the external system is initiated by the device communicating an output communication signal comprising an output current substantially greater than the input high threshold to the external system.

7. The method of claim 6 wherein the output communication signal indicates that the device is available to communicate with the external system.

* * * * *